(12) United States Patent
Jost et al.

(10) Patent No.: US 6,455,641 B1
(45) Date of Patent: Sep. 24, 2002

(54) METHOD FOR PREPARING SILICON WITH HIGH PURITY ESTER FUNCTION

(75) Inventors: Philippe Jost, Taluyers; Gérard Mignani; Philippe Olier, both of Lyons, all of (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/582,591

(22) PCT Filed: Dec. 29, 1998

(86) PCT No.: PCT/FR98/02897

§ 371 (c)(1),
(2), (4) Date: Aug. 15, 2000

(87) PCT Pub. No.: WO99/35180

PCT Pub. Date: Jul. 15, 1999

(30) Foreign Application Priority Data

Dec. 30, 1997 (FR) .............................................. 97/16677

(51) Int. Cl.⁷ .......................... C08L 83/05; C08L 83/06
(52) U.S. Cl. ...................... 525/479; 525/474; 528/31; 528/29; 528/26; 528/501; 528/490; 556/437
(58) Field of Search ................................ 525/479, 474; 528/31, 29, 26, 501, 490; 556/437

(56) References Cited

U.S. PATENT DOCUMENTS 3,450,736 A * 6/1969 Monterey
4,725,658 A    2/1988 Thayer ........................ 528/15

FOREIGN PATENT DOCUMENTS

| EP | 0 336 141 | 10/1989 | ........... C08G/77/38 |
| EP | 0 446 938 | 9/1991  | ........... C08G/77/38 |
| EP | 0 523 738 | 1/1993  | ........... C08G/83/06 |

* cited by examiner

*Primary Examiner*—Robert Dawson
*Assistant Examiner*—Kuo-Liang Peng

(57) ABSTRACT

The invention concerns a method for preparing polyorganosiloxanes with high purity ester function (acetoxyalkyl or acetoxyalkenyl), consisting in: hydrosilylation between a hydrogenopolyorganosiloxane oil and α-olefin alcohol; esterification of the resulting hydroxy-alkylated or polyorganosiloxane with an acetyl halide; elimination of α-olefin derivatives and the halohydric acid formed. The resulting polyorganosiloxanes with ester function (acetoxyalkyl) have global siloxane, α-olefin unit and/or α-olefin impurities contents corresponding to a number of α-olefin groups for 100 g of polyorganosiloxane, with ester function less than $10^{-3}$ mol.

17 Claims, No Drawings

METHOD FOR PREPARING SILICON WITH HIGH PURITY ESTER FUNCTION

This application is an application under 35 U.S.C. Section 371 of International Application Number PCT/FR98/02897 filed on Dec. 29, 1998.

The present invention relates to a method for preparing polyorganosiloxanes (silicones) with an ester function (acetoxyalkyl or acetoxyalkenyl) of high purity, primarily free of functions or by-products with an α-olefinic unsaturated bond.

The invention provides a method for producing polyorganosiloxanes with ester functions with formula (I):

   (I), where:
- symbols $R^1$, $R^2$ are identical or different and represent:
  - a $C_1$ to $C_6$ alkyl radical or a phenyl radical, preferably methyl;
  - or a —$OR^7$ radical, where $R^7$ represents a linear or branched $C_1$ to $C_6$ alkyl radical, preferably methyl;
- symbols $R^4$, $R^5$ and $R^6$ are identical or different and represent a $C_1$ to $C_6$ alkyl radical or a phenyl radical, preferably methyl;
- symbols $R^3$, which may be identical or different, represent:
  - a linear or branched $C_1$ to $C_6$ alkyl radical or a phenyl radical, preferably methyl;
  - the symbol Q;
  - or a —$OR^7$ group, where $R^7$ represents a linear or branched $C_1$ to $C_6$ alkyl radical, preferably methyl;
- symbols Q, which may be identical or different, represent an ester function or an alcohol function, respectively with formulae (1) and (2) below:

—R'OCOR"   (1)

—R'OH   (2)

where:
- R' represents a linear or branched $C_3$–$C_{20}$ alkylene group, preferably $C_3$–$C_{12}$, more particularly trimethylene or 2-methyltrimethylene;
- R" represents a methyl group;

at least one of symbols Q representing an ester function with formula (1);

- p represents an average number of 0 or more, preferably more than 5;
- q represents an average number of 0 or more, preferably more than 1; at least one of symbols $R^3$ representing the ester symbol Q of formula (1) when q equals 0;

by hydrosilylation between a hydrogeno-polyorganosiloxane with formula II):

   (II)

where:
- symbols $R^1$, $R^2$, $R^4$, $R^5$, $R^6$, p and q have the definitions given above;
- symbols $R^{3'}$, which may be identical or different, represent:
  - a linear or branched $C_1$ to $C_6$ alkyl radical or a phenyl radical, preferably methyl;
  - H;
  - or a —$OR^7$ group, where $R^7$ represents a linear or branched $C_1$ to $C_6$ alkyl radical, preferably methyl;

and an α-olefinic alcohol with formula ROH, where R represents an α-olefinic radical from which the divalent radical R' derives by opening of the α double bond and adding hydrogen, preferably an allyl or methallyl radical;

then esterification of the hydroxy-alkylated polyorganosiloxane with formula (III) obtained:

   (III)

where:
- symbols $R^1$, $R^2$, $R^4$, $R^5$, $R^6$, p and q have the definitions given above;
- symbols $R^{3''}$, which may be identical or different, represent:
  - a linear or branched $C_1$ to $C_6$ alkyl radical or a phenyl radical, preferably methyl;
  - the symbol Q';
  - or a —$OR^7$ group, where $R^7$ has the definition given above;
- symbol Q' represents the radical R'OH, where R' has the definition given above; with an acyl halide with formula XCOR", where X represents a halogen atom, in particular chlorine, and R" has the definition given above, in the absence of an esterification catalyst;

and eliminating the α olefinic by-products and the hydrohalic acid formed.

The hydrosilylation step can be carried out in any known manner at a temperature of the order of 20° C. to 200° C., preferably of the order of 60° C. to 120° C., in the presence of a hydrosilylation catalyst. Examples which can be cited are those based on platinum such as the platinum complexes described in U.S. Pat. No. 3,159,601, U.S. Pat. No. 3,159,662, U.S. Pat. No. 3,715,334, U.S. Pat. No. 3,14,730. A conventional catalyst is the KARSTEDT catalyst used, for example, in an amount of 1 to 300 parts, preferably 5 to 50 parts, by weight of platinum per million parts by weight of reactants.

The relative quantities of hydrogeno-polyorganosiloxane with formula (II) and α-olefinic alcohol ROH generally correspond to an α-olefinic alcohol/hydrogeno-polyorganosiloxane mole ratio more than 1 and less than or equal to 5, preferably more than 1 and less than or equal to 2.

In defining the moles of (α-olefinic alcohol, the elementary entity is considered to be the α-olefinic unsaturated bond; in defining the moles of hydrogeno-polyorganosiloxane, the elementary entity is considered to be the SiH function.

The hydrosilylation operation can be carried out at atmospheric pressure, preferably in bulk; however, it can be carried out in an organic solvent such as toluene, xylene, methylcycyclohexane, heptane, octane, hexamethylsiloxane.

The operation is carried out until the —SiH groups in the reaction mass have disappeared. The operation can be monitored by infrared analysis or volumetric determination.

The excess α-olefinic alcohol can be eliminated by vacuum distillation (for example 13 Pa to 14000 Pa).

The hydrogeno-polyorganosiloxane used in the hydrosilylation step is preferably selected from those with formulae:

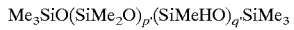

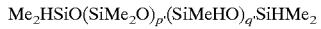

where:

Me represents the methyl radical;

p' represents an average number of the order of 0 to 500, preferably of the order of 5 to 100;

p" represents an average number of the order of 0 to 100, preferably of the order of 0 to 20;

q' represents an average number of the order of 1 to 50, preferably of the order of 1 to 30.

The α-olefinic alcohol with formula ROH used in the hydrosilylation step is preferably allyl alcohol or methallyl alcohol.

The esterification operation can be carried out at a temperature of the order of 0° C. to 100° C., preferably of the order of 15° C. to 50° C., more particularly of the order of 15° C. to 30° C.

The relative quantities of hydroxyalkylated polyorganosiloxane and acyl halide with formula XCOR" generally correspond to an acyl halide/hydroxyalkylated polyorganosiloxane mole ratio of the order of 0.1 to 2, preferably of the order of 0.1 to 1.

In defining the moles of hydroxyalkylated polyorganosiloxane, the elementary entity is considered to be the hydroxyalkyl function.

The esterification operation can be carried out at atmospheric pressure, preferably in bulk; however, it can be carried out in an organic solvent such as toluene, xylene, methylcyclohexane, heptane, octane, hexamethylsiloxane.

The acyl halide with formula XCOR" used in the esterification step is preferably acetyl chloride.

The acid halide formed by esterification can be eliminated by entraining it in an inert gas (argon, nitrogen . . . ) then by treatment with a base, such as alkali metal bicarbonates, in particular sodium bicarbonate, in stoichiometric excess over the acyl halide (for example 2 to 3 times the stoichiometry).

After eliminating the by-products by condensing under reduced pressure, the polyorganosiloxane with an ester function can then be recovered by filtering, for example.

α-olefinic siloxane motifs and α-olefinic impurities are those with formulae ≡Si—O—R, ROH and R"COOR, where R represents a linear or branched α-olefinic radical containing 3 to 20 carbon atoms, as defined above (allyl or methallyl, for example), and R" is the methyl group.

The following examples are given by way of illustration.

EXAMPLE 1

Hydrosilylation 1360 kg of allyl alcohol (i.e., about 23448 moles) and 232 g of Karstedt catalyst, a Pt"O" complex in divinyltetramethylsiloxane containing 10% of platinum, were introduced into a 5000 l reactor provided with a jacket cooling device and a condenser, at ambient temperature (20–25° C.).

The reaction mass was heated to reflux of the allyl alcohol ($T_{bp}$=97° C.) and over 3 hours, 2086 kg (i.e., 9676 moles of SiH motifs) of an oil with the following formula was introduced:

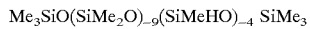

The reaction was allowed to continue at 103° C. for 4h30. The amount of SiH motifs, determined by gasometry, was less than 7×10⁻³ mole/kg.

The volatiles were eliminated at atmospheric pressure over 1 h at a temperature of 120° C. then over 3 hours at a temperature of 120° C. at 20 mbar. The residual volatiles were then entrained by nitrogen (2 h, 120° C., 40 mbars).

3642 kg of a cloudy oil was recovered.

NMR and IR analyses (v C=O: 1745 cm⁻¹) confirmed the general structure of the product obtained:

The number of moles of α-ethylenic motifs or impurities (≡Si—O-allyl, free allyl alcohol) was of the order of 0.06 mole/kg.

EXAMPLE 2

3888 g (i.e., about 12 moles of —OH motifs) of the γ-hydroxypropoxylated oil obtained from Example 1 was introduced into a 5000 l reactor provided with a jacket cooling device.

Over 2 hours, 825 g (i.e., 10.5 moles) of acetyl chloride was introduced, maintaining the temperature of the reaction mass between 17° C. and 23° C.

A substantial amount of hydrochloric acid was liberated which was eliminated with a stream of nitrogen. When addition was complete, the amount of hydrochloric acid was 3.2% by weight. Elimination was carried out at ambient temperature (22–25° C.) over 8 hours to obtain an amount of 1.56% by weight. Then 330 g of sodium bicarbonate (i.e., 3.9 moles) was added and it was allowed to react for 39 hours at ambient temperature (22–25° C.) to eliminate all of the hydrochloric acid. The volatiles were eliminated under reduced pressure over 9 hours at 10 mbar at 100° C. It was then paper filtered (616 quality) and 3479.4 g of a clear oil with a dynamic viscosity of 44 mPa.s at 25° C. was recovered.

NMR and IR analyses (v C=O: 1745 cm⁻¹) confirmed the general structure of the product obtained:

The number of moles of motifs or α-ethylenic impurities (—Si—O-allyl, free allyl alcohol, allyl acetate) was of the order of 10⁻⁶ mole/kg.

EXAMPLE 3

3575 g (i.e., about 11 moles of —OH motifs) of the γ-hydroxypropoxylated oil obtained from Example 1 was introduced into a 5000 l reactor provided with a jacket cooling device.

Over 1h30, 870 g (i.e., 11.1 moles) of acetyl chloride was introduced, maintaining the temperature of the reaction mass between 20° C. and 25° C.

A substantial amount of hydrochloric acid was liberated which was eliminated with a stream of nitrogen. When addition was complete, the amount of hydrochloric acid was 5.7% by weight. Elimination was carried out at ambient temperature (22–25° C.) over 22 hours to obtain an amount of 0.47% by weight. Then 95 g of sodium bicarbonate (i.e., 1.1 moles) was added and it was allowed to react for 35 hours at ambient temperature (22–25° C.) to obtain an HCl content of 0.0013% by weight. The volatiles were eliminated under reduced pressure over 8 hours at 4 mbars at 100° C. It was then paper filtered (616 quality) and 3076.3 g of a clear oil with a dynamic viscosity of 51 mPa.s at 25° C. was recovered which contained no trace of hydrochloric acid.

NMR and IR analyses (v C=O: 1745 cm⁻¹) confirmed the general structure of the product obtained:

The number of moles of motifs or α-ethylenic impurities (—Si—O-allyl, free allyl alcohol, allyl acetate) was of the order of $10^{-5}$ mole/kg.

EXAMPLE 4

3503.3 g (i.e., about 10.8 moles of —OH motifs) of the γ-hydroxypropoxylated oil obtained from Example 1 was introduced into a 5000 l reactor provided with a jacket cooling device.

Over 7h20, 848.1 g (i.e., 10.8 moles) of acetyl chloride was introduced, maintaining the temperature of the reaction mass below 45° C.

A substantial amount of hydrochloric acid was liberated which was eliminated with a stream of nitrogen. When addition was complete, the amount of hydrochloric acid was 2% by weight. Elimination was carried out at ambient temperature (22–25° C.) over 17 hours to obtain an amount of 0.9% by weight. Then 295 g of sodium bicarbonate (i.e., 3.5 moles) was added and it was allowed to react for 4.5 hours at ambient temperature (22–25° C.) to obtain an HCl content of 0.001% by weight. The volatiles were eliminated under reduced pressure over 9 hours at 12 mbars at 100° C. It was then paper filtered (616 quality) and 3418 g of a clear oil with a dynamic viscosity of 54 mPa.s at 25 C. was recovered which contained no trace of hydrochloric acid.

NMR and IR analyses (v C=O: 1745 cm$^{-1}$) confirmed the general structure of the product obtained:

$$Me_3SiO(SiMe_2O)\sim9(SiMe[CH_2CH_2CH_2OCOCH_3]O)_{\sim4}SiMe_3$$

The number of moles of motifs or α-ethylenic impurities (—Si—O-allyl, free allyl alcohol, allyl acetate) was of the order of $10^{-6}$ mole/kg.

What is claimed is:

1. A process for the preparation polyorganosiloxanes with ester functions of the formula (I):

(I), wherein:

the symbols $R^1$, $R^2$ are identical or different and represent:
a $C_1$ to $C_6$ alkyl radical or a phenyl radical; or
a —OR$^7$ radical, wherein R$^7$ represents a linear or branched $C_1$ to $C_6$ alkyl radical;

the symbols $R^4$, $R^5$ and $R^6$ are identical or different and represent a $C_1$ to $C_6$ alkyl radical or a phenyl radical;

the symbols $R^3$, which may be identical or different, represent:
a linear or branched $C_1$ to $C_6$ alkyl radical or a phenyl radical;
the symbol Q; or
a —OR$^7$ group, wherein R7 represents a linear or branched $C_1$ to $C_6$ alkyl radical;

the symbols Q, which are identical or different, represent an ester function or an alcohol function, respectively with formulae (1) and (2) below:

—R'OC(O)R"  (1)

—R'OH  (2)

wherein:

R' represents a linear or branched $C_3$–$C_{20}$ alkylene group; and

R" represents a methyl group;

at least one of symbols Q representing an ester function with formula (1);

p represents an average number of 0 or more;

q represents an average number of 0 or more, at least one of symbols R$^3$ representing the ester symbol Q of formula (1) when q equals 0; said process comprising the steps of:

a) carrying out a hydrosilylation reaction between a hydrogeno-polyorganosiloxane with formula (II):

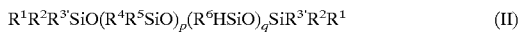

(II)

wherein:

the symbols $R^1$, $R^2$, $R^4$, $R^5$, $R^6$, p and q have the definitions given above;

the symbols R$^{3'}$, which may be identical or different, represent:
a linear or branched $C_1$ to $C_6$ alkyl radical or a phenyl radical; H;
or a —OR$^7$ group, wherein R$^7$ represents a linear or branched $C_1$ to $C_6$ alkyl radical;

and an α-olefinic alcohol with formula ROH, wherein R represents an α-olefinic radical from which the divalent radical R' derives by opening of the a double bond and adding hydrogen; and, then, b) carrying out an esterification reaction of the hydroxy-alkylated polyorganosiloxane with formula (II1) obtained in step a):

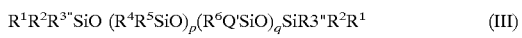

(III)

wherein:

the symbols $R^1$, $R^2$, $R^4$, $R^5$, $R^6$, p and q have the definitions given above;

the symbols R$^{3''}$, which may be identical or different, represent:
a linear or branched $C_1$ to $C_6$ alkyl radical or a phenyl radical;
the symbol Q'; or
a —OR$^7$ group, wherein R$^7$ has the definition given above; the symbol Q' represents the radical R'OH, wherein R' has the definition given above;

with an acyl halide with formula XC(O)R", wherein X represents a halogen atom and R" has the definition given above, and in the absence of an esterification catalyst; and c) recovering said polyorganosiloxanes with an ester function by eliminating the α olefinic by-products and the hydrohalic acid formed.

2. A process according to claim 1, wherein:

R' is trimethylene or 2-methyltrimethylene;

p represents an average number of 5 or more;

q represents an average number of 1 or more;

R represents an allyl or methallyl radical;

R$^{3''}$ is methyl, and

X represents a chlorine atom.

3. A process according to claim 1, wherein step a) is carried out at a temperature of 20° C. to 200° C., in the presence of a hydrosilylation catalyst.

4. A process according to claim 3, wherein the temperature is of 60° C. to 120° C.

5. A process according to claim 1, wherein the hydrogeno-polyorganosiloxane with formula (II) and α-olefinic alcohol ROH are present in an α-olefinic alcohol/hydrogeno-polyorganosiloxane mole ratio of more than 1 and less than or equal to 5.

6. A process according to claim 5, wherein the ratio is more than 1 and less than or equal to 2.

7. A process according to claim 1, wherein the hydrogenopolyorganosiloxane used in step a) is:

Me$_3$SiO(SiMe$_2$O)$_{p'}$(SiMeHO)$_{q'}$SiMe$_3$

Me$_2$HSiO(SiMe$_2$O)$_{p'}$(SiMeHO)$_{q'}$SiHMe$_2$, or

Me$_2$HSiO(SiMe$_2$O)$_{p''}$SiHMe$_2$ wherein:

Me represents the methyl radical;

p' represents an average number of 0 to 500;

p" represents an average number of 1 to 100; and q' represents an average number of 1 to 50.

8. A process according to claim 7, wherein:

p' represents an average number of 5 to 100;

p" represents an average number of the order of 0 to 20; and q' represents an average number of 1 to 30.

9. A process according to claim 1, wherein the α-olefinic alcohol with formula ROH used in the hydrosilylation step is allyl alcohol or methallyl alcohol.

10. A process according to claim 1, wherein step b) is carried out at a temperature of 0° C. to 100° C.

11. A process according to claim 10, wherein the temperature is of 15° C. to 30° C.

12. A process according to claim 1, wherein the hydroxyalkylated polyorganosiloxane and the acyl halide with formula XC(O)R" correspond to an acyl halide/hydroxyalkylated polyorganosiloxane mole ratio of 0.1 to 2.

13. A process according to claim 12, wherein the ratio is of 0.1 to 1.

14. A process according to claim 1, wherein the acyl halide with formula XC(O)R" used in step b) is acetyl chloride.

15. A process according to claim 1, wherein the acid halide formed in step b) is further eliminated by entraining in an inert gas then by treatment with a base, and wherein further elimination of by-products is carried out by distillation under reduced pressure.

16. A process according to claim 1, wherein the polyorganosiloxanes with an ester function obtained in step c) have an overall amount of α-olefinic siloxane motifs or α-olefinic impurities with formulae =Si—O—R, ROH, or R"COOR, corresponding to a number of α-olefinic groups per 100 g of polyorganosiloxane with an ester function, of less than $10^{-4}$ mole.

17. A process according to claim 16, wherein the amount a of α-olefinic siloxane motifs or α-olefinic impurities with formulae =Si—O—R, ROH, or R"COOR, corresponds to a number of α-olefinic groups per 100 g of polyorganosiloxane with an ester function, is of less than $5 \times 10^{-4}$ mole.

* * * * *